United States Patent
Orr et al.

(10) Patent No.: US 8,401,371 B1
(45) Date of Patent: Mar. 19, 2013

(54) METHOD AND APPARATUS FOR AUTOMATIC TIME-SHIFTING FOR A CONTENT RECORDER

(75) Inventors: Stephen J. Orr, Markham (CA); Godfrey W. Cheng, Mississauga (CA)

(73) Assignee: ATI Technologies ULC, Markham, Ontario (CA)

( * ) Notice: Subject to any disclaimer, the term of this patent is extended or adjusted under 35 U.S.C. 154(b) by 872 days.

(21) Appl. No.: 09/645,670

(22) Filed: Aug. 24, 2000

(51) Int. Cl.
*H04N 5/76* (2006.01)

(52) U.S. Cl. ........................ 386/291; 386/298

(58) Field of Classification Search .............. 386/46, 386/83, 125, 40, 124, 96, 109, 291, 298, 386/296, 299, 326; 379/102, 114, 112, 120, 379/218.01, 201.01; 348/134, 734; 359/196
See application file for complete search history.

(56) References Cited

U.S. PATENT DOCUMENTS

| | | | | |
|---|---|---|---|---|
| 133,043 | A * | 11/1872 | Carr ........................... | 301/122 |
| 4,703,356 | A * | 10/1987 | Herzog et al. ............. | 348/715 |
| 5,241,428 | A * | 8/1993 | Goldwasser et al. ...... | 386/109 |
| 5,410,326 | A * | 4/1995 | Goldstein .................. | 348/734 |
| 5,477,263 | A | 12/1995 | O'Callaghan et al. | |
| 5,706,388 | A * | 1/1998 | Isaka ........................ | 386/125 |
| 6,209,025 | B1 * | 3/2001 | Bellamy ..................... | 709/217 |
| 6,233,389 | B1 * | 5/2001 | Barton et al. ............... | 386/46 |
| 6,275,865 | B1 * | 8/2001 | Zou .......................... | 719/313 |
| 6,324,338 | B1 * | 11/2001 | Wood et al. ................ | 386/83 |
| 6,363,204 | B1 * | 3/2002 | Johnson et al. ............ | 386/46 |
| 6,658,231 | B2 * | 12/2003 | Nakatsuyama .............. | 455/3.06 |
| 6,792,323 | B2 * | 9/2004 | Krzyzanowski et al. ...... | 700/90 |
| 2001/0038690 | A1 * | 11/2001 | Palmer et al. ............ | 379/218.01 |
| 2002/0032907 | A1 * | 3/2002 | Daniels ....................... | 725/51 |
| 2002/0048448 | A1 * | 4/2002 | Daniels ....................... | 386/40 |
| 2003/0070182 | A1 | 4/2003 | Pierre et al. | |
| 2003/0131356 | A1 * | 7/2003 | Proehl et al. ............... | 725/58 |
| 2003/0133043 | A1 * | 7/2003 | Carr ........................... | 348/563 |

FOREIGN PATENT DOCUMENTS

| | | | |
|---|---|---|---|
| DE | 19755742 | * | 6/1999 |
| JP | 09-009753 | * | 7/1998 |
| WO | 9848566 | * | 10/1998 |
| WO | WO-9848566 | * | 10/1998 |

OTHER PUBLICATIONS

Advanced Television Enhancement Forum Specification (ATVEF), Feb. 2, 1999, 1.1r26 pp. 1-37.*

* cited by examiner

*Primary Examiner* — Robert Chevalier

(74) *Attorney, Agent, or Firm* — Faegre Baker Daniels LLP

(57) ABSTRACT

A content player includes a pausable mass storage device player that can be used to record and play content. The pausable mass storage device can become paused in response to an assertion of a pause signal. Once paused, the content player remains paused until the pause signal is deasserted. The content player also includes an event detector that is coupled to the pausable mass storage device player. The content player detects a non-viewer initiated event, (e.g., an automatic event such as the receipt of an email with embedded enhanced content), and to assert the pause signal in response thereto. The content player receives content, detects an event, and in response to detecting the event, pauses the content to a presentation device; and spools the content onto the mass storage device.

21 Claims, 2 Drawing Sheets

METHOD AND APPARATUS FOR AUTOMATIC TIME-SHIFTING FOR A CONTENT RECORDER

FIELD OF THE INVENTION

The invention relates generally to set top boxes and more particularly to a method and apparatus for automatic time-shifting for a content recorder.

BACKGROUND OF THE INVENTION

The introduction of digital video recorders has made time-shifting of video content easy for many home entertainment system users. Time-shifting of video content allows a user to "pause" the reception of the video content by directing the video content to a video recorder while maintaining an instantaneous image of the video content on a television or other video device. The digital video recorder continues to receive the video content, and "spools" the video content onto the digital video recorder. When the user later resumes viewing, the digital video recorder continues receive video content and to spool the video content onto the digital video recorder, but presents the video content from a point at which the user had paused the reception. In other words, the user plays content that is delayed with respect to the video content being spooled.

While a user is enjoying home entertainment by watching a television program, listening to a broadcast over a stereo system, or watching streaming video over the Internet, events can occur that demand the user's attention. A telephone or doorbell may ring and demand the user's attention. A kitchen timer may signal that dinner is ready, or a washing machine may complete a wash cycle. When such events occur, the user typically pauses the video content (initiating time-shifting) and later resumes viewing. Like digital video recorders, smart appliances have found their way into the home and made life more convenient for users. Smart appliances, such as an oven or a washing machine that are coupled to the Internet or to a LAN (local area network) within a home, may be programmed to begin and end over the internet or LAN. Smart appliances can initiate processes and can exchange information over the Internet or LAN.

Another technology is the enhanced content found in web-based content. Enhanced content can invoke processes, such as opening a web browser, on a client computer system. Enhanced content may also be embedded within an email message. When an email reader or web browser detects enhanced content, the email reader or web browser responds by initiating the process identified in the enhanced content. Also, it is known to have events embedded in broadcast television signals.

However, the digital video recorder generally has a "pause" button on a remote control to initiate a "pause" function. The remote control requires the user to press the pause button to initiate the pause function. This can be a problem for users who do not happen to be near the remote control when the event occurs.

DETAILED DESCRIPTION OF A PREFERRED EMBODIMENT OF THE INVENTION

The present invention includes an embodiment in which a digital video recorder includes an automatic process. The automatic process detects non-viewer initiated events and pauses the reception of video content in response to such an event. In one embodiment of the present invention, the digital video recorder automatically detects events and pauses the reception of video content in response to an event, and also automatically initiates a time-shifting function and allows delayed viewing automatically in response to a termination of an event. In another embodiment of the present invention, the digital video recorder automatically detects events and pauses the reception of a video content in response to an event, and then allows a user to initiate a time-shifting function and initiate delayed viewing manually.

Figure 1:
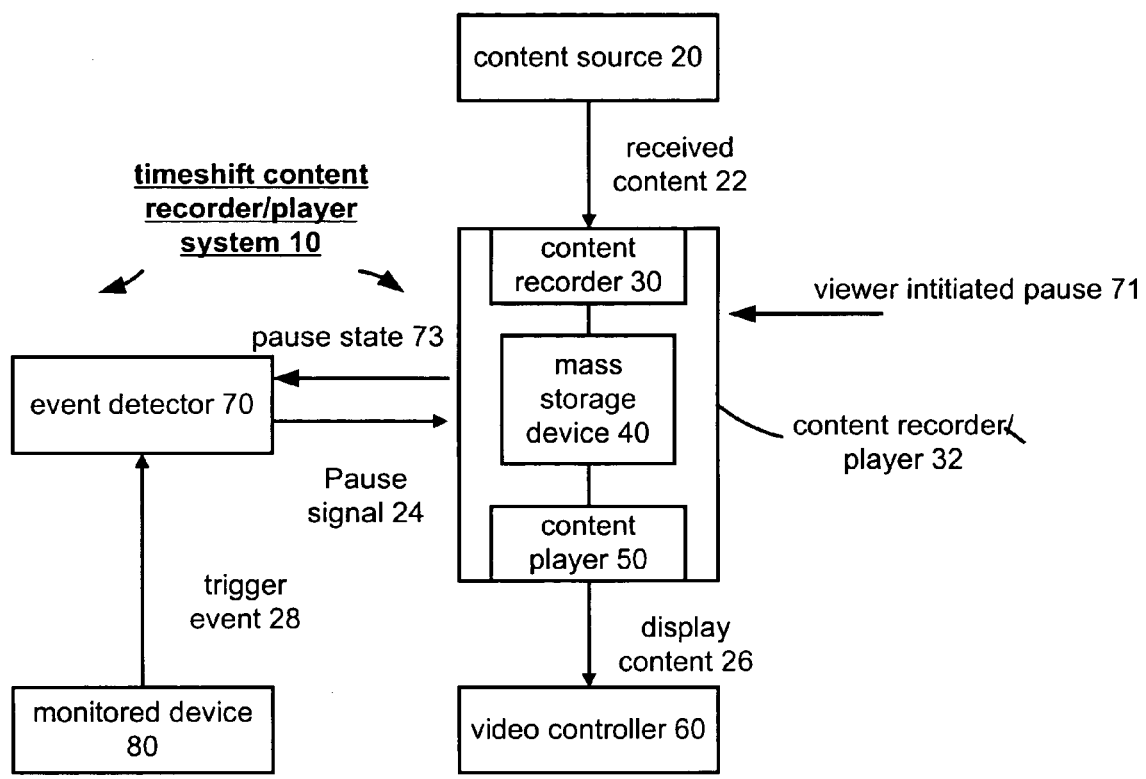
FIG. 1 shows a time-shift content recorder/player system 10 in accordance with one embodiment of the present invention.

FIG. 1 shows a time-shift content recorder/player system 10 in accordance with one embodiment of the present invention. The time-shift content recorder/player system 10 obtains video content from a content source 20, and includes a content recorder/player 32, a video controller 60, an event detector 70, and a monitored device 80. The content source 20 may be a video cable system, a satellite television system, a radio-frequency transmission system providing broadcast video information, an analog video tape player providing video information, a computer network providing streaming video information or any other suitable video source. The time shift content recorder/player system 10 may be a set top box or other suitably programmed device.

The content source 20 is coupled to provide a received content 22 to the content recorder/player 32. The content recorder/player 32 includes a content recorder 30, a mass storage device 40, and a content player 50. The content recorder 30 receives the received content 22 from the content source 20 and provides the received content 22 to the mass storage device 40, regardless of whether the content recorder/player 32 is in a "paused" state.

The mass storage device 40 contains a ring, stack, linked list, or other data structure for storing the received content 22. The data structure includes an entry point and an exit point. The entry point is a location in the mass storage device 40 at which the received content 22 is stored. As the received content 22 is stored in the mass storage device 40, the entry point is advanced through the mass storage device. The exit point is initially equal to the entry point, and is discussed in greater detail with respect to the content player 50.

The content player 50 retrieves video content from the mass storage device 40 and provides the video content to a video controller 60. The exit point is a location in the mass storage device 40 at which the video content is retrieved. The content player 50 retrieves video content from the mass storage device 40 and provides the video content to a video controller 60 when the content recorder/player 32 is not in a "paused" state. However, when the content recorder/player 32 is in a "paused" state, the content player 50 persistently plays a single frame.

The single frame that is played is a frame, contained within the video content, that is selected when the content recorder/player 32 enters a "paused" state. To play the single frame, the content player 50 persistently provides the single frame to the video controller 60. A location within the video content at which the frame is located is referred to as the exit point. When no event has occurred that would initiate a time-shifting process, the entry point and the exit point are equal.

In other words, when no event has occurred that would initiate a time-shifting process, the received content 22 is both stored in the mass storage device 40 by the content recorder 30 and provided to the video controller 60 by the content player 50. The video controller 60, in other words, plays the received content 22 "live," that is, as it is received. However, when the content recorder/player 32 is in a paused state, the content player 50 persistently provides the single frame to the video controller 60.

The event detector 70 determines whether the content recorder/player 32 is in a "paused" state by detecting a pause state 73 of the content recorder/player 32. The pause state is based on a viewer initiated pause event such as by the activation of a pause button on a remote control or a previous non-viewer initiated event which has caused the content recorder/player 32 to enter the pause state. The viewer initiated pause event is shown by line 71. The event detector 70 is operative to detect events that initiate a time-shifting process. The event detector 70 is operative to automatically detect a plurality of non-viewer initiated events. For example, the event detector 70 may be programmed or coupled to receive an electric signal from a telephone line, a doorbell, a kitchen timer, or an appliance such as a washing machine.

The monitored device 80 is, for example, a telephone line, a doorbell, a kitchen timer, or an appliance such as a washing machine. However, the monitored device 80 may also be a web server, client-side computer system executing a web browser or email handler, or smart appliance interface operative to detect signals from smart appliances. The monitored device 80 may also be a processor executing a speech recognition process, or a transmitter operatively coupled to a computer system, or any other suitable interface. The event detector 70 is any device capable of detecting signals from the monitored device 80, and controlling whether the content recorder/player 32 is in a paused state.

The electric signal may be regarded as a pause signal, causing the content recorder/player 32 to transition to a paused state. The event detector 70 may also be programmed or coupled to detect a software interrupt such as the receipt of an email, the beginning or execution of a software process, a beginning or ending of a smart appliance process, or a ATVEF/Intercast/Watermark Web link. The event detector 70 may be programmed or coupled to detect enhanced content embedded in received content included within an email message, or sent via an email attachment.

Such events are not initiated by the user or by any person. Instead, the event is initiated automatically by a smart appliance, by an electric signal from an appliance such as a doorbell or telephone, or by an email handler or web browser. The event detector may also be operative to respond to a speech recognition device, and can detect an event comprising a spoken command.

Figure 2:
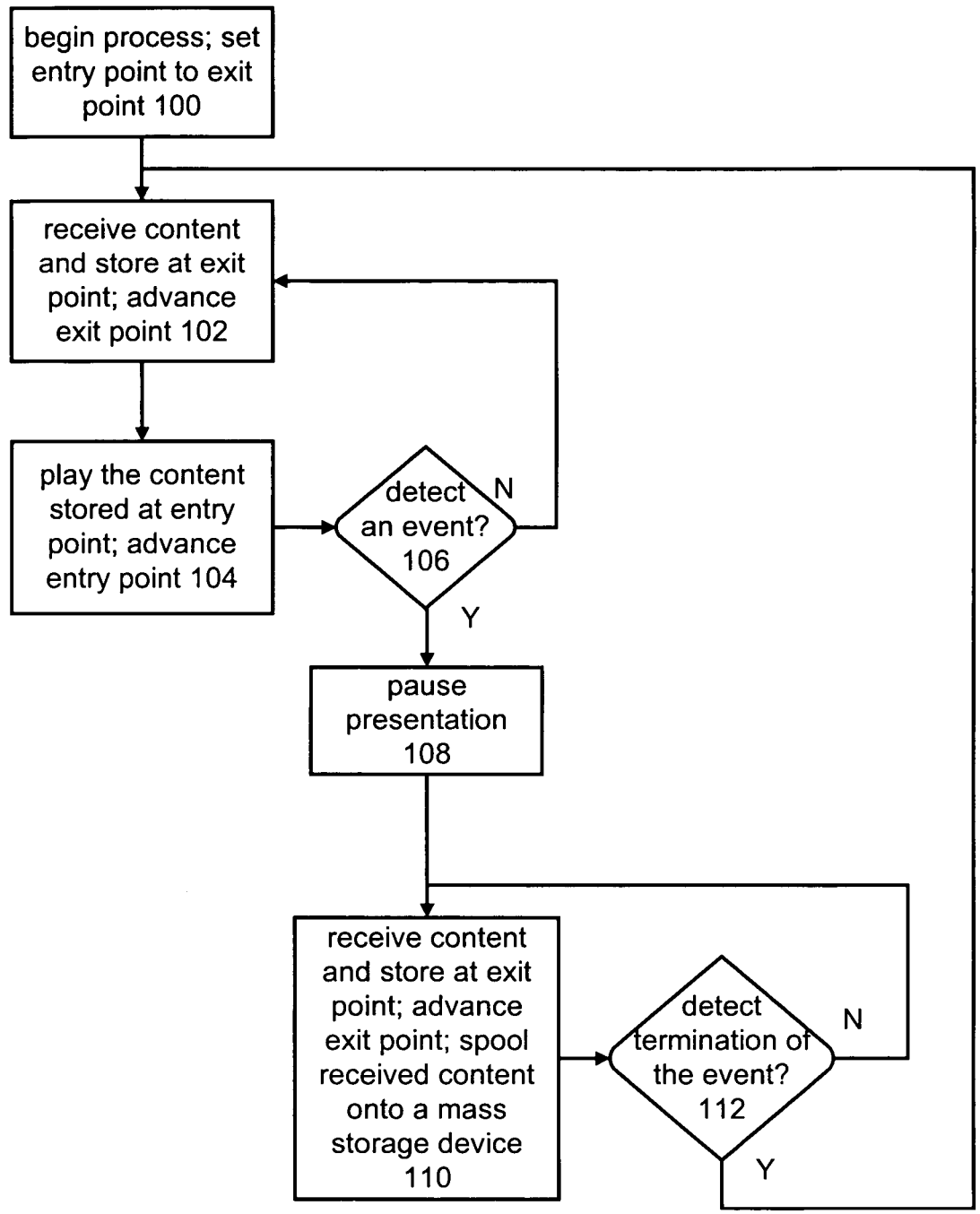
FIG. 2 shows a flowchart illustrating a method for time-shifting in response to an event.

FIG. 2 shows a flowchart illustrating a method for time-shifting in response to an event that may be carried out, for example, by a set top box, integrated system or other system. The method begins at step 100, at which a play lag is set to zero. If desired, the play lag may be implemented as a FIFO (first in first out) buffer having an exit point and an entry point. Before any events have occurred, the exit point and entry point are pointers to a location in the mass storage device where the most recently recorded video content has been stored. As video content is received at step 102, the exit point and entry point advance through the mass storage device. Once the play lag has been set, the set top box proceeds to step 102 in which a set top box receives video content. It will be understood that the set top box may be replaced with or integrated into a television, a HDTV, a computer monitor, a digital video recorder, or other device capable of presenting and/or storing video information. It will also be understood that the video content may be replaced with audio content.

At step 104, the set top box presents the video content onto a television to which it is coupled (either directly or through another device). As stated previously, the television may be replaced with a home theater system, a HDTV, a computer monitor, a digital video recorder, or other device capable of presenting and/or storing video information, additional devices may be added to the television, including additional televisions or additional speakers or recording devices.

At step 106, the set top box detects an event. The event may be, for example, a telephone ring, an email reception, a beginning or ending of a smart appliance process, or an ATVEF/Intercast/Watermark Web link. The event may be embedded in the video content, included within an email message, or sent via an email attachment. The event may be detected in hardware or in software. In accordance with one embodiment of the present invention, the set top box may be programmed to detect trigger events, such as the receipt of an email. The set top box may also be programmed to detect status events, such as an alert from a smart appliance. Such an alert typically indicates that the smart appliance is in a predetermined state, and the alert continues until the state of the smart appliance is reset. For example, if an oven or a washing machine completes a cycle, the oven or washing machine may generate an alert to the user.

However, the event is not initiated by the user or by any person. Instead, the event is initiated automatically by a smart appliance, by an electric signal from an appliance such as a doorbell or telephone, by an email handler, web browser or other suitable event source. Although step 106 is depicted as a polling loop that repeatedly checks to determine whether a non-viewer initiated event has occurred, step 106 may be replaced with an interrupt that may be ORed with a signal generated in response to a "pause" button on a remote control if the system is incorporated with a conventional viewer based remote control initiated pause. The set top box may be said to be in a pause state.

When the set top box detects an event, at step 108, the set top box pauses the presentation by directing the video content to a video recorder while maintaining an instantaneous image of the video content on a television or other video device via the content recorder/player 32. The set top box continues to receive the video content, and at step 110 the digital video recorder "spools" the video content onto the mass storage device. The set top box continues to time-shift the video content by receiving and storing the video content, while presenting a single video frame on the television.

While the set top box is in the pause state, the digital video recorder continues to record content. If the play lag is implemented as a FIFO buffer, the entry point continues to advance through the mass storage device as additional video content is recorded. The exit point, however, remains a pointer to the location in memory in which the most recently recorded video content had been stored immediately before the event was detected. If the play lag is implemented as a vector, the vector advances as additional video content is recorded. The play lag may be understood as a vector from the location in memory in which the most recently recorded video content had been stored immediately before the event was detected to the location in memory in which the most recently recorded video content is being stored.

At step 112, the set top box detects the end of the event, or more specifically the absence of any existing events. When the set top box is programmed to detect status events, such as an alert from a smart appliance, the event terminates when the smart appliance is reset. However, if a second status event has begun before the first status event has terminated, then the set top box does not detect the end of the absence of existing events, since an event still exists. When no existing events are detected, the set top box proceeds to step 114. While at least one event remains, the set top box returns to step 110.

Although shown as a polling loop that repeatedly checks to determine whether an event exists, step 112 may be replaced with an interrupt that is generated by a smart appliance, by an electric signal from an appliance such as a doorbell or telephone, or by an email handler or web browser.

In accordance with one embodiment of the present invention, the event may also be terminated by a user. The termination of an event by a user cancels any existing events and causes the set top box to proceed from the pause state to a time-shifting state. The event may be manually terminated, for example, by the user pressing a "resume" button on the remote control to "unpause" the digital video recorder. The resume button on the remote control is merely one example of a resume indication; if the set top box is connected to the Internet or to a LAN, the user may invoke a resume indication via a keyboard, mouse, or other computer input device. In accordance with one embodiment of the present invention, a software application may contain a GUI (graphical user interface) that assists the user in generating the resume indication.

When the set top box detects the termination of the event, the set top box returns to the step 102. The set top box continues to receive content and store the content at the entry point in the mass storage device, and to advance the entry point. Receiving and storing video content is largely unaffected by the entering and exiting of the pause state. At step 104, however, the exit point is no longer equal to the entry point. The set top box plays the content stored at exit point and advances the exit point 104. The user resumes viewing, and the digital video recorder continues to receive video content and to spool the video content onto the digital video recorder, but presents the video content from a point at which the user had paused the reception. In other words, the user plays content that is delayed with respect to the video content being spooled.

It should be understood that the implementation of other variations and modifications of the invention in its various aspects will be apparent to those of ordinary skill in the art, and that the invention is not limited by the specific embodiments described. For example, the content recorder/player may be implemented for video, audio, or other types of content as well. It is therefore contemplated to cover by the present invention, any and all modifications, variations, or equivalents that fall within the spirit and scope of the basic underlying principles disclosed and claimed herein.

What is claimed is:

1. A method for controlling the time shifting of content comprising:
   receiving content by a digital video recording system;
   detecting by a digital video recording system, a non-viewer initiated event that is not embedded in the content; and
   in response to detecting the non-viewer initiated event;
   pausing by a digital video recording system, the content to a presentation device; and
   in response to the same detected non-viewer initiated event, spooling by a digital video recording system, the content onto a mass storage device.

2. The method of claim 1, further comprising:
   detecting a resume indication; and
   in response to detecting the resume indication, unpausing from the event to resume presentation of the content.

3. The method of claim 1, wherein the event is a software-detected event.

4. The method of claim 3, wherein the event is receiving email.

5. The method of claim 1, wherein the event is a hardware-detected event.

6. The method of claim 5, wherein the event is receiving a telephone call.

7. The method of claim 2, wherein: the resume indication occurs automatically in response to a termination of the event.

8. The method of claim 2, wherein the resume indication occurs in response to a user control.

9. A content player comprising:
   a pausable mass storage device player operative to output content, the pausable mass storage device becoming paused in response to an assertion of a pause signal and remaining paused until the pause signal is deasserted wherein the pausable mass storage device player is further operative to begin recording content in response to the pause signal;
   an event detector coupled to the pausable mass storage device player and operative to detect a non-viewer initiated event that is not embedded in the content and to assert the pause signal in response thereto.

10. The content player of claim 9, wherein the pausable mass storage device player is further operative to receive the assertion of the pause signal from a monitored hardware device.

11. The content player of claim 10, wherein the pausable mass storage device player is further operative to receive the assertion of the pause signal in response to detecting a telephone call.

12. The content player of claim 10, wherein the pausable mass storage device player is further operative to receive the assertion of the pause signal in response to detecting that another device is beginning operation.

13. The content player of claim 10, wherein the pausable mass storage device player is further operative to receive the assertion of the pause signal in response to detecting that another device is terminating operation.

14. The content player of claim 10, wherein the pausable mass storage device player is further operative to receive the assertion of the pause signal in response to detecting that another device is changing operating state.

15. The content player of claim 9, wherein the pausable mass storage device player is further operative to receive the assertion of the pause signal from a software device.

16. The content player of claim 15, wherein the pausable mass storage device player is further operative to receive the assertion of the pause signal in response to detecting receiving an email.

17. The method of claim 1, including receiving an assertion of a pause signal based on a hardware device.

18. A method for controlling the time shifting of content comprising:
   receiving content by a digital video recording system;
   detecting by the digital video recording system, a non-viewer initiated event; and
   in response to detecting the event;
   pausing by a digital video recording system, the content to a presentation device;
   spooling by a digital video recording system, the content onto a mass storage device in response to the same detected non-viewer initiated event; and
   wherein the event is receiving email.

19. The method of claim 18 including:
   detecting a resume indication; and
   in response to detecting the resume indication, unpausing to resume presentation from the event.

20. A method for controlling the time shifting of content comprising:
- receiving content by a digital video recording system;
- detecting by a digital video recording system, a non-viewer initiated event that is not embedded in the content;
- in response to detecting the event;
- pausing by a digital video recording system, the content to a presentation device; and
- in response to the same detected non-viewer initiated event, spooling by a digital video recording system, the content onto a mass storage device;
- detecting by a digital video recording system, a resume indication that occurs automatically in response to a termination of the event; and
- in response to detecting the resume indication, unpausing to resume presentation of the content.

21. The method of claim 1, wherein pausing the content to the presentation device causes the presentation device to persistently display a single frame.

* * * * *